(No Model.) 7 Sheets—Sheet 1.
G. CALDER, Jr.
CASH REGISTER AND INDICATOR.
No. 543,980. Patented Aug. 6, 1895.
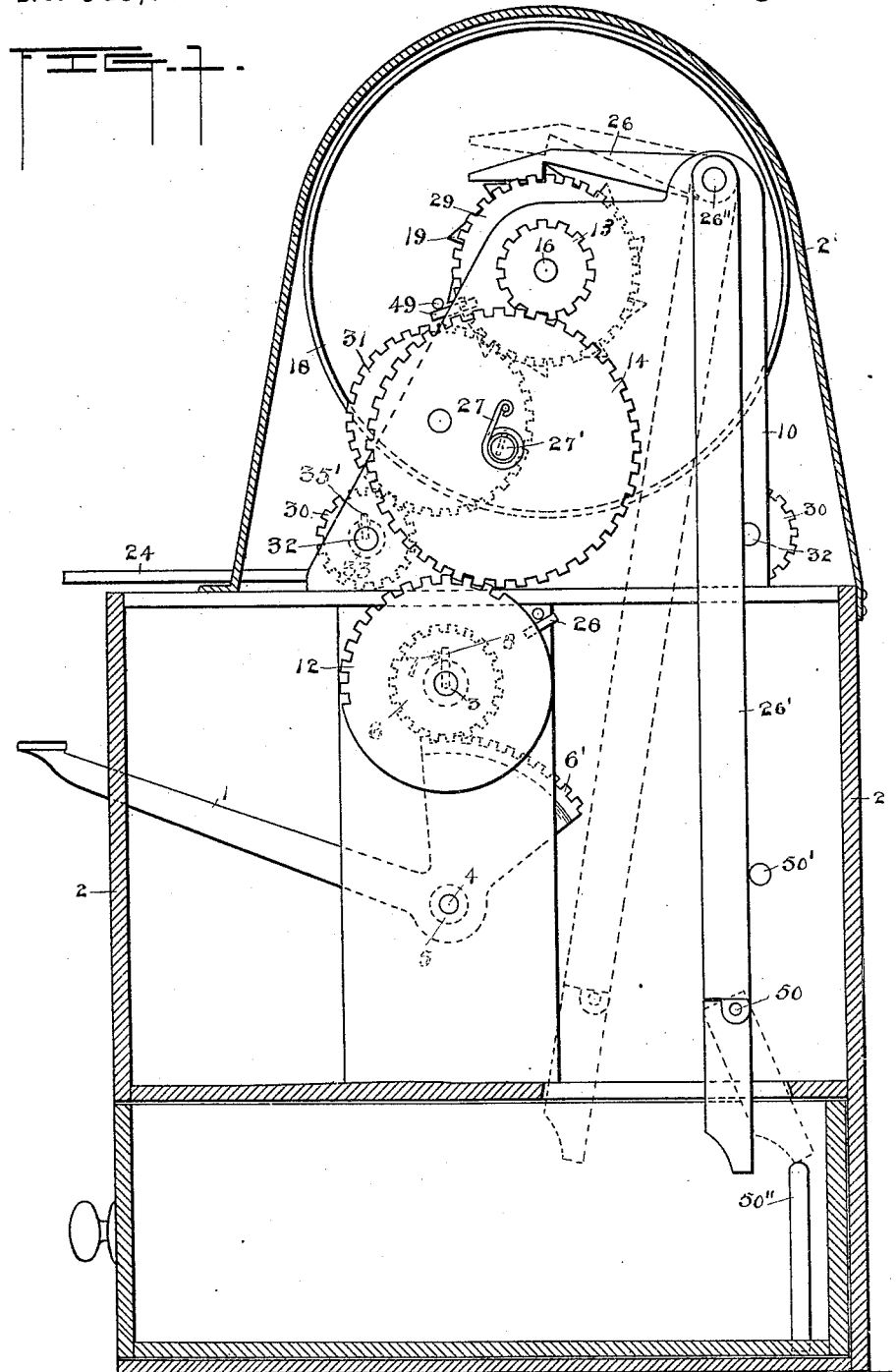
Witnesses
Arch. M. Catlin
Henry S. Jones
Inventor
George Calder, Jr.
by Benj. R. Catlin
Attorney

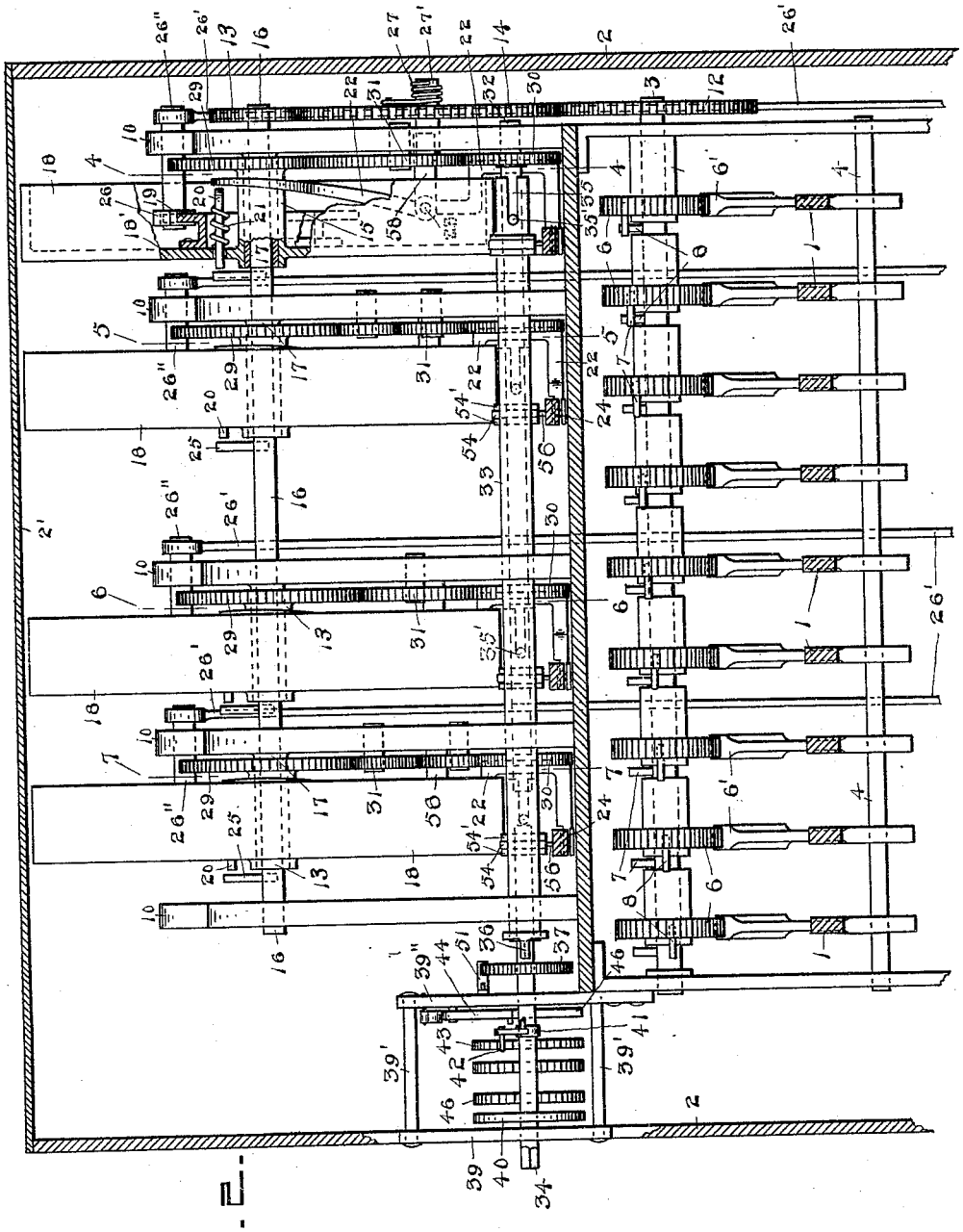

(No Model.)  7 Sheets—Sheet 3.
G. CALDER, Jr.
CASH REGISTER AND INDICATOR.
No. 543,980. Patented Aug. 6, 1895.
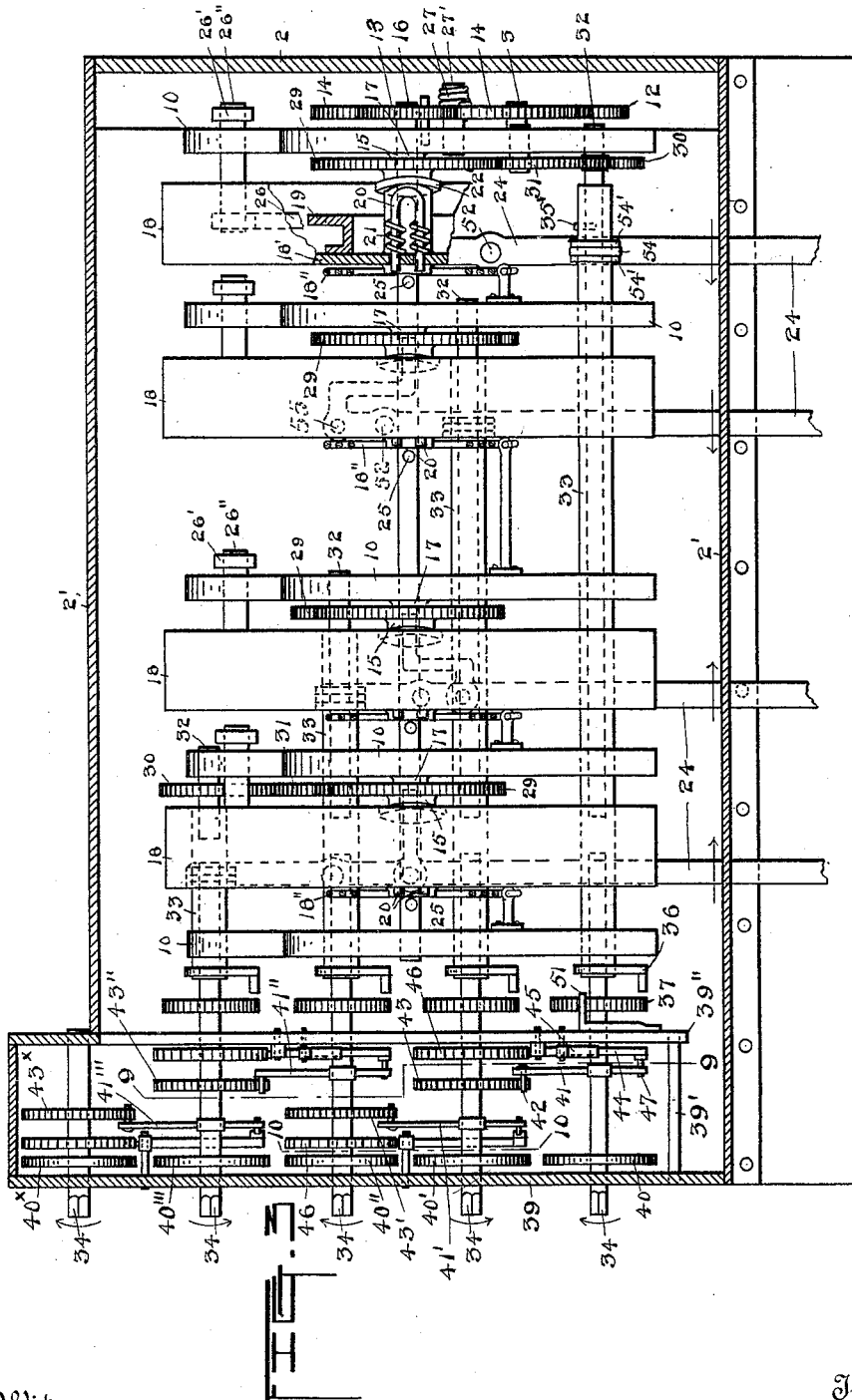
Witnesses
Arch. M. Catlin.
Henry S. Jones.
Inventor
George Calder, Jr.
by Benj. R. Catlin
Attorney (No Model.) 7 Sheets—Sheet 4.
G. CALDER, Jr.
CASH REGISTER AND INDICATOR.
No. 543,980. Patented Aug. 6, 1895.
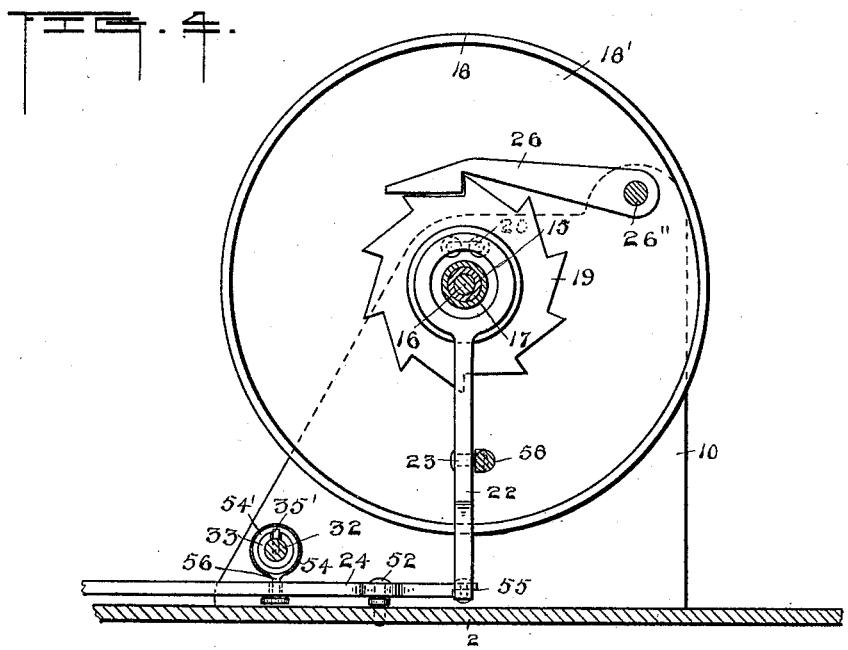
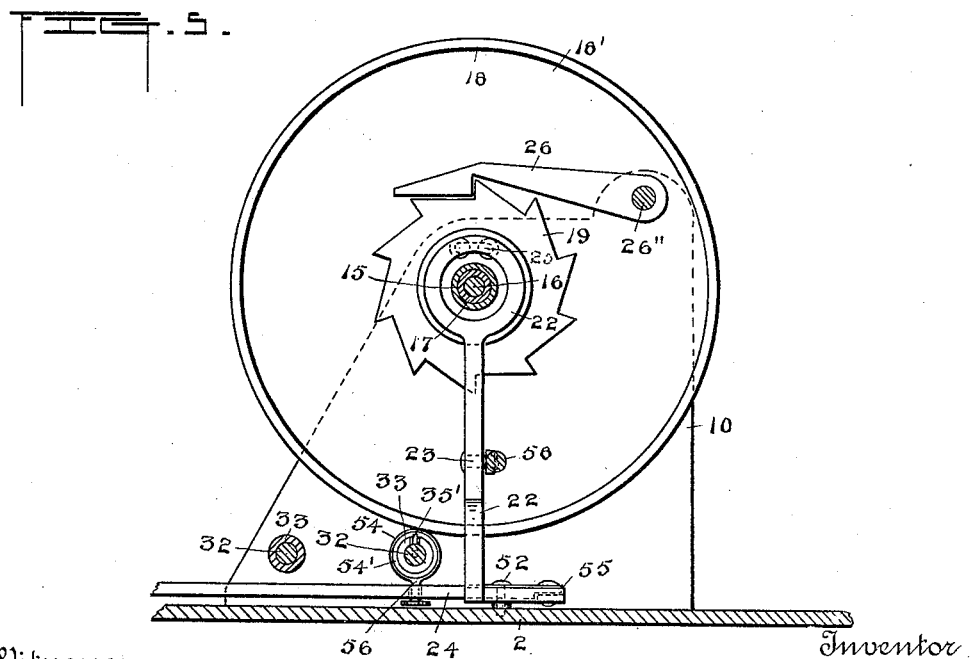
Witnesses
Arch. M. Catlin.
Henry S. Jones.
Inventor
George Calder, Jr.
by Benj. R. Catlin
Attorney (No Model.) 7 Sheets—Sheet 5.
G. CALDER, Jr.
CASH REGISTER AND INDICATOR.
No. 543,980. Patented Aug. 6, 1895.
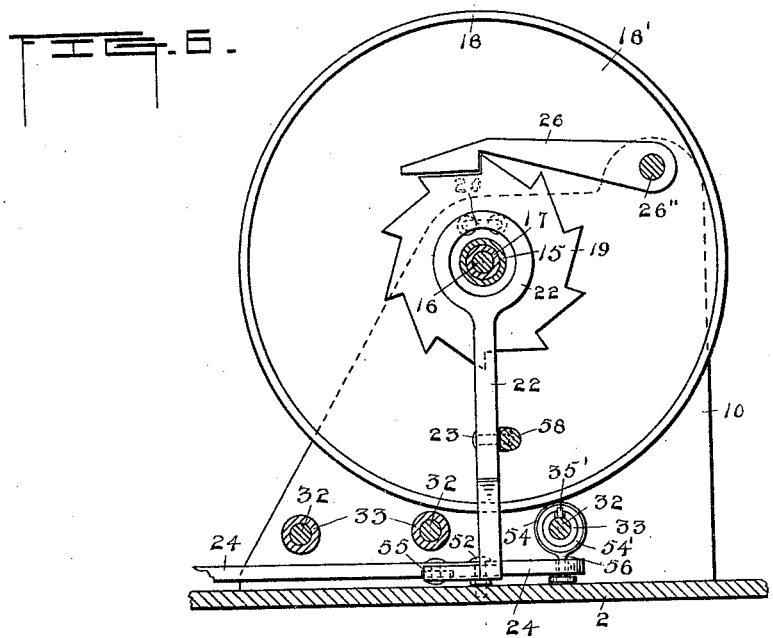
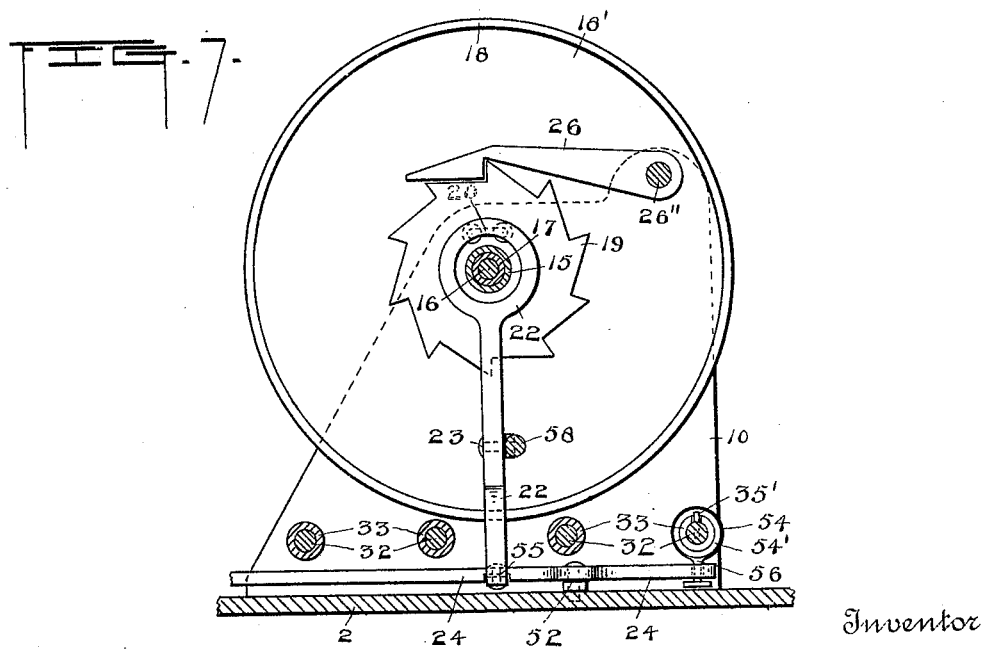
Witnesses:
Arch. M. Catlin.
Henry S. Jones
Inventor
George Calder, Jr.
by Benj. R. Catlin
Attorney (No Model.)

G. CALDER, Jr.
CASH REGISTER AND INDICATOR.

No. 543,980.  Patented Aug. 6, 1895.

Witnesses
Arch. M. Catlin.
Mark Collins

Inventor
George Calder, Jr
by
Benj. R. Catlin Attorney

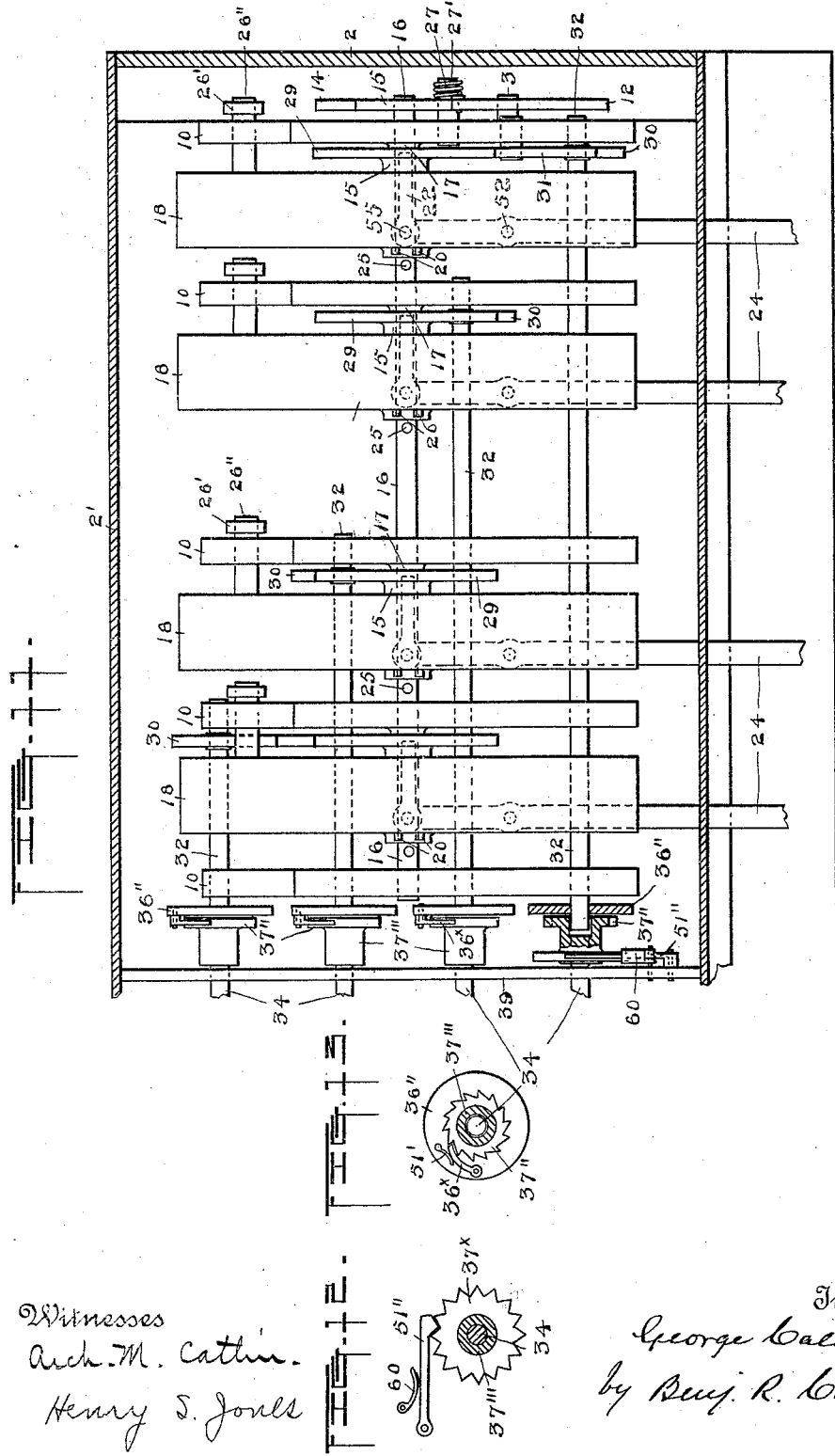

UNITED STATES PATENT OFFICE.

GEORGE CALDER, JR., OF LANCASTER, PENNSYLVANIA.

CASH REGISTER AND INDICATOR.

SPECIFICATION forming part of Letters Patent No. 543,980, dated August 6, 1895.

Application filed December 14, 1894. Serial No. 531,822. (No model.)

*To all whom it may concern:*

Be it known that I, GEORGE CALDER, Jr., a resident of Lancaster, in the county of Lancaster and State of Pennsylvania, have invented certain new and useful Improvements in a Combined Register and Adder; and I do hereby declare the following to be a full, clear, and exact description of the invention, such as will enable others skilled in the art to which it pertains to make and use the same.

The object of the invention is to improve combined cash registers and adders or machines for indicating singly many payments or deposits, and also their sum; and it consists in the construction hereinafter described and particularly pointed out.

Figure 8:
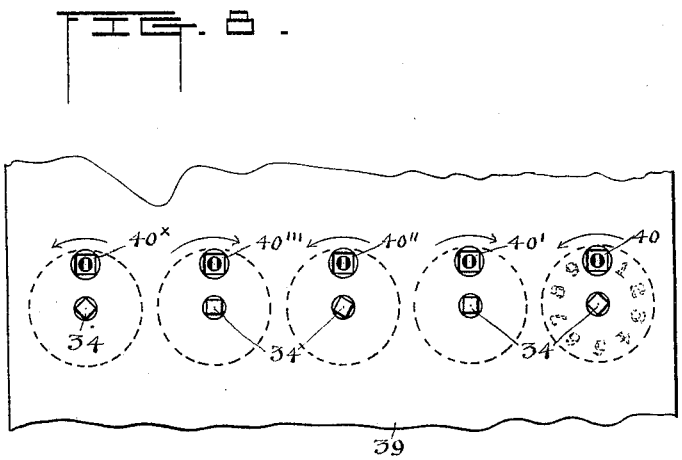
Figure 9:
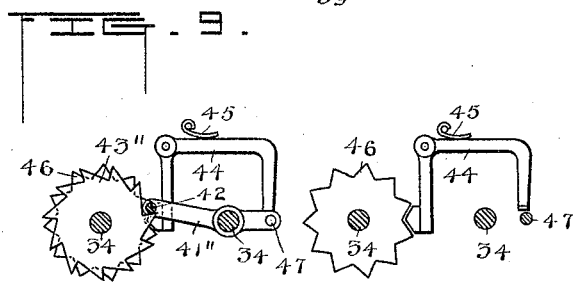
Figure 10:
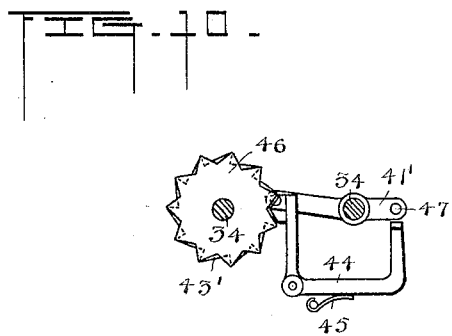

In the accompanying drawings, Figure 1 is an end elevation, the wall of an inclosing-case being omitted. Fig. 2 is a front elevation, parts being broken away. Fig. 3 is a plan, parts being broken away. Figs. 4, 5, 6, and 7 are sections on lines 4, 5, 6, and 7, respectively, of Fig. 2. Fig. 8 is a partial end elevation. Figs. 9 and 10 are sections on lines 9 and 10 of Fig. 3, respectively. Fig. 11 is a partial plan of a modification. Figs. 12 and 13 are elevations of details.

Numeral 2 indicates a case or box containing a drawer in its lower part and having a top on which are supported several posts or stands 10, which together with several devices sustained by said stands will in practice be inclosed either by an upper extension of case 2 or by a hood or inclosure 2' situated upon said case. Through the front wall of the case project nine keys 1, which are supported on a shaft 4 and have hubs 5 surrounding and turning freely on said shaft. The inner ends of these keys or key-levers are quadrantal gears 6' that mesh with pinions 6 normally loose on shaft 3. On this latter shaft are arranged pins 8, nine in number, corresponding to the number of keys.

7 are pins fixed transversely to the pinions 6. Under the operation of a key the appropriate pinion is turned on shaft 3 until its pin 7 engages a pin 8 fixed to said shaft, whereupon the shaft is compelled to move with the pinion a distance determined by the relative situation of pin 8, corresponding to the particular key employed. The object of the partial rotation of shaft 3 is to correspondingly move numeral-wheels 18 marked with digits, (or with the digits and higher numbers,) and to expose particular numbers thereon, according to the key struck.

The shaft 4 is fixed to the end walls of the case, and shaft 3 and also a shaft 16 have bearings and freely turn in said walls. On the end of shaft 3 outside the case is fixed a gear-wheel 12, which meshes with an intermediate wheel 14, loosely supported to turn on a stud 27'. A returning-spring fixed to the stud and also to the wheel is denoted by 27.

28 (see Fig. 1) denotes pins which stop the rotation of these wheels under the influence of said spring. Wheel 14 meshes with a wheel 13, fixed on shaft 16, which shaft can be rotated by the keys through the medium of these gears and of the other intermediate devices described.

The numeral-wheels 18 are normally loose on the hollow stud 17. Each has the form of a short cylinder, and has one end closed by a head 18'. To the head of each numeral-wheel is fixed one end of a hub 15 that has fast upon its other end a gear-wheel 29, adapted to operate adding mechanism, as will be hereinafter described.

17 denotes tubular studs fixed to the posts 10. The hubs 15 turn freely on these tubes 17 and shaft 16 within them.

20 denotes a two-armed sliding clutch supported in the head and in a bracket 20' and normally held idle by a spring 21. The clutch, when pushed through the head, embraces a pin 25 fast on shaft 16, so that the numeral-wheel will rotate with said shaft. This operation compresses spring 21, which will return the clutch and free the wheel from the shaft whenever the clutch-moving and spring-compressing lever 22, is withdrawn.

The numeral-wheel clutch is made operative, as above described, by the suitable movement of a lever 22, which has an annular end 22' surrounding and moving freely lengthwise of the hub 15.

23 denotes the fulcrum of this lever, said fulcrum being fixed to a stud 58 projecting from a post 10. As shown, the lever is approximately vertical and has its lower end pivotally connected at 55 to a horizontally-disposed lever 24, whose fulcrum is at 52. By moving the free end of lever 24 in the direction of the arrow its opposite end will suitably move lever 22 to render the clutch operative and thereby connect the numeral-wheel 18 with the shaft 16. The clutch is disengaged by the spring 21 as soon as lever 24 is relieved from the hand of the operator. The numeral-wheel 18 when thus freed from said shaft 16 is retained in its position by the pawl 26 holding the ratchet-wheel 19, and when relieved from said pawl is automatically returned to its zero or initial position by a spring 18″. This position is determined by the pins 49, (see Fig. 1,) one fast on the wheel and the other on a post 10, suitably situated in the path of the wheel-carried pin.

As represented, the numeral-wheels are four in number and correspond to units, tens, hundreds, and thousands. For convenience in reading the decimals the hundreds and tens or dollars and cents wheels may have a wider space between them than the others. Each wheel has the several devices for clutching above described, and these are all similar, except that the levers 22 and 24 are varied in form and situation to adapt levers 24 for a supplemental function in connection with the adding mechanism.

From the foregoing it will be understood that to operate the indicator—that is, to turn the numeral-wheel 18, corresponding to the units, tens, or other denominations, so as to expose a particular digit (or number) through an opening in the inclosing-case—the appropriate wheel will first be clutched to shaft 16 by moving the corresponding lever 24 in the direction of the arrow and thus mediately moving clutch 20 to embrace pin 25. Thereupon the key corresponding to the particular digit is moved until pin 7 engages pin 8 and the key movement then continued to its limit, thereby rotating shaft 3 and the several intermediate gears and the numeral-wheel 18 the requisite distance to display through case 21 the number desired. The wheel 18 is held in this display or number-indicating position by a pawl 26, which engages a tooth on the ratchet 19, fixed to numeral-wheel 18′, until said pawl is lifted. This pawl has an axis or pivot 26″, having a bearing in the upper end of a post 10 and having fixed on its opposite end a pendent bar 26′. 50′ is a stop for said bar, and 50 is a joint which permits the lower end of the bar to freely fold or bend in one direction, but will not permit it to pass the vertical plane in the other.

50″ denotes a rod or wire, fixed in the cash-drawer, which strikes all the bars whenever the drawer is opened, with the effect to lift pawls 26 and permit the springs 18″ to return wheels 18 to zero.

Simultaneously with the above-described indicating operation the number indicated is added to numbers previously registered, if any, and the sum indicated or displayed on supplemental numeral-wheels 40 by the same operation of the keys and levers. This is effected by means of the following-described mechanism: 39 denotes a plate held in fixed relation by posts 39′ to a plate 39″, which may be the end wall of a case inclosing the numeral-wheels 18, but preferably is made detachable. 34 denotes shafts having bearings in these plates and having fixed thereon the numeral-wheels 40, provided with numbers on their faces or sides next to plate 39 and visible, when the wheels are suitably moved, through openings in the plate. These numeral-wheel shafts 34 are moved by the keys and gears before described, which turn shaft 16 and gears 29 fixed on hub 15. Each gear 29 when turned with hub 15 rotates a gear 30 by means of one or two intermediate gears 31. The number of these gears 31 are alternately one and two, for the reason that the alternate numeral-wheels of the adder to be described require to be turned in opposite directions. The gear 30 is fast on a shaft 32, one end of which has a bearing in a post 10. Its other end extends into a tubular shaft 33, which has bearings in the several posts 10 and at its end next the adding mechanism a ratchet-engaging finger 36. At its end next the gear-wheel 30 is a slot 35 (see Fig. 2) to receive a pin 35′ fixed to shaft 32, the shafts 32 and 33 being thus held together circumferentially and the tubular one 33 permitted to slide lengthwise of the other. The shaft 34 extends into the tubular shaft 33, and the latter is slid upon shafts 32 and 34 to engage and disengage the finger 36 with the wheel 37, which finger is fixed to said shaft 33. When thus engaged the several parts 32, 33, and 34 are locked together circumferentially and rotate together under the influence of gear-wheel 30, driven by the gears 31 and 29, as before described. This locking of the shafts together constitutes them a compound shaft, and it is effected by lever 24, which is slotted to receive an arm 56 of a ring 54, situated between two collars 54′ fast on the tubular shaft 33. Through the medium of this ring and collar the tubular shaft 33 is moved by lever 24 in a manner to engage or disengage said latter shaft with shafts 34 at 36 whenever lever 24 is suitably moved.

The numeral-wheels 18 are combined in the manner set forth, each with a separate gear 30 and with its compound shaft, consisting of parts 32, 33, and 34, in order to move the supplementary numeral-wheels 40, having digits of the same decimal value as those on the corresponding wheel 18.

51 denotes a spring-pawl to hold ratchet-wheel 37 to prevent it from overrunning.

The completion of an entire rotation of shaft 34 and of its numeral-wheel 40 causes the rotation of shaft 34′, and consequently of its numeral-wheel one-tenth, if the machine be constructed for the decimal system. This is effected by a bar 41 fixed on shaft 34, and having a pin 42 adapted to strike a tooth on the toothed wheel 43 and move said wheel the distance of one tooth—that is, one-tenth of a rotation. An entire rotation of numeral-wheel 40 will expose, in turn, the nine digits and a cipher through the opening in plate 39, and simultaneously with the exposure of zero thereon the pin 42 will move toothed wheel 43, as stated, and expose a number on wheel 40' one unit larger than the one before exposed until zero is reached, whereupon a similar bar 41' will move toothed wheel 43' one-tenth of a rotation and expose a number on numeral-wheel 40'' one digit larger than that displaced by the operation. Toothed wheels 43'' and 43$^\times$ and numeral-wheels 40'' and 40$^\times$ are in like manner moved by bar 41'' and 41''', respectively.

44 (see Figs. 9 and 10) denotes spring-held pawls to obviate overrunning and hold the gear 43 in proper relation with bar 41. Their springs are indicated by 45. The pawls are pivoted to plate 39'' or 39 and one end of the springs fixed to the same. The pawls are momentarily relieved from duty to permit the partial rotation of their respective ratchet-wheels 46 by the action of pins 47 against the free ends of spring-held pawls 44. The units, tens, hundreds, and thousands, indicated by the respective numeral-wheels 18, will be thus added and the indication of their sums given by the numeral-wheels 40 to 40$^\times$. The latter indicates ten thousands in the present instance, and will only denote sums transferred from the preceding wheel 40''' in the manner described, since, as the machine is represented, it has no corresponding numeral-wheel 18 by which numeral-wheel 40$^\times$ could be directly moved through the medium of a compound shaft, as is the case with each of the other numeral-wheels in the adder.

It will be understood that if the units-wheel 18 has been rotated three times, 3 will be indicated on the tens-wheel 40', said wheel having been moved three times by three complete rotations of shaft 24 and wheel 40, each movement of wheel 40' being the tenth of a rotation. If, however, tens are to be indicated by the second or tens wheel 18—for example, three dimes—the second key and lever 24 and the corresponding wheel 18 will be moved, which will have the effect to move the second shaft 34 and numeral-wheel 40' three-tenths of a rotation and so as to indicate 3, and this is effected without the intermediate agency of the first shaft 34 and its operating-bar.

At the end of the business day or at any time desired the several numeral-wheels can be set at zero by means of the shafts 34, which project through plate 39' for the purpose.

It is obvious from the foregoing that the mechanism described can be used for registering and adding pounds, shillings, and pence, or any denominations of currency or measure having a determinate relative value, by suitably changing the teeth in the various gears and otherwise modifying the parts in usual manner, too well known to need further specific description.

In Fig 11 is represented a modification by which the mechanism is simplified in some respects. According to this modification the tubular part 33 of the compound shaft above described is omitted and the shaft 32 is made to carry the gear 30 and a pawl-supporting disk 36''. 37'' denotes a ratchet-wheel fixed on a hub 37''', which receives the ends of the adjacent ends of shafts 32 and 34, as indicated. Said hub and shaft 34 may be made in one piece or otherwise connected to rotate together. 51 is a spring to hold pawl 36$^\times$ in engagement with the ratchet-wheel. 51'' is a pawl to hold toothed wheel 37 and shaft 34 at rest and to prevent overrunning. 60 is a spring to hold the pawl engaged except when shaft 34 is turned through the medium of the pawl and ratchet and the hub. In this modification the levers 24 are all of the same order and have fulcrums at 52. The levers 22 are similar to those operating the clutch for the units-wheel 18 in the form shown in Fig. 4.

Having thus described my invention, what I claim, and desire to secure by Letters Patent, is—

1. In combination a series of indicating numeral wheels 18, returning springs operative to return the wheels to zero, a series of adding numeral wheels 40, devices to prevent the automatic return of said latter wheels, key levers to suitably turn said indicating wheels when connected to a shaft 16, said shaft, a clutch to connect the shaft and wheels 18, intermediate devices including a clutch to connect said shaft 16 and numeral wheels 40 and the pivotally connected levers 24 and 22 to operate the clutches, all substantially as set forth.

2. In combination a series of indicating numeral wheels 18, returning springs operative to return the wheels to zero, a series of adding numeral wheels 40, devices to prevent the automatic return of said latter wheels, key levers to suitably turn said indicating wheels when connected to a shaft 16, said shaft, a clutch to connect the shaft and wheels 18, intermediate devices including a clutch to connect said shaft 16 and numeral wheels 40, said intermediate devices consisting of gears 29, 31 and 30 and the compound shaft having a clutch pin 36 and a ratchet wheel 37, and the pivotally connected levers 24 and 22 to operate the clutches, all substantially as set forth.

3. In combination a series of indicating numeral wheels 18 said wheels each having a hub 15 and head 18' returning springs operative to return the wheels to zero, a series of adding numeral wheels 40, devices to prevent the automatic return of said latter wheels, key levers 1 having quadrantal gears, numeral wheel shaft 16, intermediate gears whereby the keys turn the shaft, pins 25 on the shaft outside the heads, clutches 20 situated within the wheels and movable through the heads and levers 22 bent to extend within the wheels and operate the clutches, substantially as set forth.

4. In combination a series of indicating numeral wheels 18 said wheels each having a hub 15 and head 18', returning springs operative to return the wheels to zero, a series of adding numeral wheels 40, devices to prevent the automatic return of said latter wheels, key levers 1 having quadrantal gears, numeral wheel shaft 16, intermediate gears whereby the keys turn the shaft, pins 25 on the shaft outside the heads, clutches 20 situated within the wheels and movable through the heads and levers 22 bent to extend within the wheels and operate the clutches, ratchet wheels 19 fast on head of numeral wheel 18 and pawls 26, said pawls each having an arm 26' adapted to be operated to disengage a pawl and ratchet on the opening of a drawer, substantially as set forth.

5. In combination with indicating mechanism including numeral wheels such as 18 and the intermediate gears and clutches, the case comprising plates 39 and 39'', the shafts 34 the numeral wheels 40, the ratchet wheels 46 and pawls 44, the wheels 43 and bars 41 fixed on said shafts and provided with pins 42 and 47, the former being arranged to move the pawls simultaneously with the operation of the other to move its wheel the distance of a tooth, substantially as set forth.

6. In an adding machine the combination of two numeral wheels and numeral wheel shafts said shafts having bearings in a case, a holding pawl such as 44 pivoted to the case, a toothed wheel 46, a ratchet wheel 43, a numeral wheel 40, each wheel fast on one of the shafts, a bar 41 fast on the other shaft, said bar being adapted to simultaneously disengage the pawl from the ratchet and move the toothed wheels and numeral wheels and means for rotating the shaft that carries the bar with pins, substantially as set forth.

In testimony whereof I have signed this specification in the presence of two subscribing witnesses.

GEORGE CALDER, JR.

Witnesses:
H. D. SACKETT,
CHAS. E. LONG.